(12) United States Patent
Sasakura et al.

(10) Patent No.: US 6,894,096 B2
(45) Date of Patent: May 17, 2005

(54) METHOD OF PRODUCING RESIN VARNISH FOR PRINTING INK

(75) Inventors: Keiji Sasakura, Warabi (JP); Hiroshi Toyoda, Koshigaya (JP)

(73) Assignee: Harima Chemicals, Inc., Hyogo (JP)

( * ) Notice: Subject to any disclaimer, the term of this patent is extended or adjusted under 35 U.S.C. 154(b) by 0 days.

(21) Appl. No.: 10/438,614

(22) Filed: May 15, 2003

(65) Prior Publication Data

US 2003/0236331 A1 Dec. 25, 2003

(30) Foreign Application Priority Data

Jun. 21, 2002 (JP) ........................................ 2002-182216

(51) Int. Cl.$^7$ ................................................. C08L 1/00
(52) U.S. Cl. ........................ 524/270; 527/602; 530/210
(58) Field of Search ........................ 524/270; 527/602; 530/210

(56) References Cited

U.S. PATENT DOCUMENTS

| | | | | |
|---|---|---|---|---|
| 3,849,150 A | * | 11/1974 | Schrempp et al. | 106/410 |
| 4,936,916 A | * | 6/1990 | Shinmitsu et al. | 523/210 |
| 5,635,591 A | * | 6/1997 | Williams et al. | 530/210 |
| 5,763,565 A | | 6/1998 | Williams et al. | 530/210 |
| 5,969,071 A | * | 10/1999 | Matzinger | 527/602 |
| 6,022,947 A | * | 2/2000 | Frihart et al. | 530/212 |
| 6,469,125 B1 | * | 10/2002 | Fontana et al. | 528/158.5 |

FOREIGN PATENT DOCUMENTS

| JP | 10-88052 | 4/1998 |
|---|---|---|
| JP | 2001-261768 | 9/2001 |

* cited by examiner

*Primary Examiner*—David W. Wu
*Assistant Examiner*—Henry S. Hu
(74) *Attorney, Agent, or Firm*—Jordan and Hamburg LLP

(57) ABSTRACT

A resin varnish for printing ink is produced by condensing phenol and formaldehyde in an ink solvent to obtain an ink solvent solution of resole initial condensate, after which the resole initial condensate and a rosin ester containing 30–60 wt % non-aromatic conjugate resin acid and 20–60 wt % aromatic resin acid are reacted at 100–250° C. in a system containing ink solvent or in a system containing ink solvent and drying oil. A high-viscosity, high-molecular-weight ink resin is produced efficiently by reacting, with resole initial condensate in ink solvent, a rosin ester containing specified contents by percentage of conjugate acid and aromatic resin acid. The resin varnish obtained has very few decomposition components and nonuniformly gelled components, so it also is suitable for screen printing ink and letterpress printing ink, in addition to offset printing ink.

8 Claims, No Drawings

METHOD OF PRODUCING RESIN VARNISH FOR PRINTING INK

BACKGROUND OF THE INVENTION

The present invention relates to a method of producing resin varnish for printing ink, and particularly relates to a method of productively producing a resin varnish with superior high-speed printability, a high molecular weight, a high softening point, and a high viscosity.

A rosin-modified phenolic resin is used widely as the principal component of the ink in offset printing, a representative printing method.

In the general conventional method of producing a rosin-modified phenolic resin, a phenolic resin and polyvalent alcohol are added to a molten resin, and phenol is added at an elevated temperature from 230° C. to 270° C., after which an esterification reaction is performed.

In this bulk polymerization method, a high temperature is required to accelerate the reaction between the rosin and polyvalent alcohol and to produce a high-molecular-weight resin in the molten state.

In recent years, to improve printed material productivity, the printer speed has been increased and inks for high-speed printing have been developed, so even in a rosin-modified phenolic resin, which is a resin for ink, high-speed printability (e.g., misting control, quick drying, in-printer stability, emulsification resistance) is demanded.

To achieve such performance, it is necessary to produce a resin with a high molecular weight, a high softening point, and a high viscosity. However, when an attempt is made to use a conventional bulk polymerization method to produce a rosin-modified phenolic resin with a high molecular weight, the increase in the melting viscosity causes nonuniformity within the system and an excessive stirring load, or there are problems when removing the molten resin from the reaction system, thereby limiting the molecular weight, softening point, and viscosity of the producible resin.

Also, a gel varnish for printing is prepared by dissolving the obtained rosin-modified phenolic resin in an ink solvent and drying oil by means of the following process, and by then adding a gelling agent (gellant), as required, and then cooking. However, a problem such as the following results: When a gel varnish is prepared by redissolving a solid varnish resin, the high-molecular-weight resin decomposes readily and the low-molecular components resulting from decomposition adversely affect the ink performance and the reaction with the gelling agent is considerable, so it becomes difficult to control the production of gel varnish. In Japanese Laid-Open Patent Publication Number 10-88052 (hereinafter, Prior Art 1), the present applicant previously disclosed a method of producing a resin varnish by subjecting phenol and formaldehyde to a condensation reaction in xylene to produce a phenol-formaldehyde initial condensate (hereinafter, resole initial condensate), and by then reacting in an ink solvent this resole initial condensate and a rosin ester. (See claim 1 and paragraphs 30 and 31 of Prior Art 1.)

Also, in Japanese Laid-Open Patent Publication Number 2001-261768 (hereinafter, Prior Art 2), a method of producing a resin varnish in the presence of a mixed basic oxide catalyst of lithium oxide and barium oxide, by adding a rosin, formaldehyde, phenol, and a polyol to drying oil or semidrying oil, or by further adding this to a solution mixed with a petroleum solvent is disclosed. (See the claims and paragraph 23 of Prior Art 2.) In the production method of the aforementioned Prior Art 1 and 2, in contrast with the conventional bulk polymerization method in which the reaction system readily becomes nonuniform, because of the solution polymerization reacted in the solvent system, the viscosity of the entire system is reduced and it becomes uniform, so it becomes easy to stably and economically produce a high-viscosity, high-molecular-weight resin by reducing the reaction temperature.

However, as is evident from the aforementioned Prior Art 1, for example, when a rosin ester (gum rosin ester is used all embodiments) and the resole initial condensate are reacted in a solvent, because of various factors attributable to rosin characteristics such as the type of rosin and the degree of rosin modification, differences occur in the reactivity of the added phenol with the rosin ester, and this difference causes significant fluctuation of the resin's viscosity and molecular weight, so there is considerable scope for improving the production of an ink resin with superior printability. The technical challenge of the present invention is to highly efficiently produce a resin with superior high-speed printability, high viscosity, and high molecular weight, by further improving the aforementioned Prior Art 1 to increase the reactivity between the rosin ester and the resole condensate.

SUMMARY OF THE INVENTION

In developing a method of productively producing resin varnish for printing ink, the reactivity of resole condensate with rosin ester in an ink solvent was studied assiduously. As a result, it was determined that, in the reaction by means of this solvent method, the non-aromatic conjugate resin acid in the rosin ester contributes significantly to the reactivity of the addition, and even aromatic resin acids that do not contribute to the reactivity are important in ensuring solubility in the ink solvent.

Consequently, based on this knowledge, the present invention was completed after discovering that, when the reaction is performed a rosin ester such that the contents by percentage of both a conjugate resin acid and an aromatic resin acid are within specific ranges with the resole condensate in the ink solvent, it is possible to efficiently design an ink resin with few decomposition products, high viscosity, and high molecular weight; that, in conventional bulk polymerization methods, decomposition reactions also proceed rapidly, simultaneously with the addition reaction, so gum rosins with good reactivity became the principal raw materials of production, but in reactions in an ink solvent, even if a tall oil rosin containing comparatively more aromatic resin acid than gum rosin is used, as long as it has a content by percentage within the aforementioned specific range, a high-performance ink resin can be produced efficiently, among other advantages.

The present invention, a method of producing resin varnish for printing ink, is composed of (a) a condensation process that yields an ink solvent solution of a phenol-formaldehyde initial condensate by condensing the phenol and formaldehyde in the ink solvent, and (b) a resinification process that produces a resin varnish by reacting, at 100–250° C. in the ink solvent, this phenol-formaldehyde initial condensate and a rosin ester that, based on the proton NMR measurement method, contains 30–60 wt % non-aromatic conjugate resin acid and 20–60 wt % aromatic resin acid.

In this case, in the aforementioned resinification process, instead of performing a resinification reaction in an ink solvent, the reaction can be performed in a mixed solution of ink solvent and drying oil. Furthermore, in the resinification process, these can be reacted in the presence of a petroleum resin, an epoxy compound, an isocyanate compound, and so forth. The rosin ester used in the aforementioned resinification process is produced by esterifying a rosin and a rosin derivative in a polyhydric alcohol, and the various rosin esters can be used individually or together.

Examples of the aforementioned rosins include modified rosins (e.g., disproportionate rosins, polymerized rosins, hydrogenated rosins), in addition to native rosins such as wood rosins, gum rosins, and tall oil rosins composed principally of resin acid (e.g., abietic acid, palustric acid, neoabietic acid, pimaric acid, isopimaric acid, dehydroabietic acid). However, said disproportionate rosins and hydrogenated rosins react poorly with resole condensates, so they are used in combination with other rosins.

The aforementioned rosin derivative is either an unsaturated carboxylic acid-modified rosin prepared by reacting an unsaturated carboxylic acid with a rosin, or another rosin. Examples of the unsaturated carboxylic acid include fumaric acid, (anhydrous) maleic acid, (anhydrous) itaconic acid, and so forth. Also, when producing a rosin ester, it also is possible to simultaneously use another dibasic acid. Examples of this dibasic acid include adipic acid, sebacic acid, azelaic acid, anhydrous phthalic acid, isophthalic acid, terephthalic acid, anhydrous trimellitic acid, pyromellitic acid, dimer acid, trimer acid, and so forth.

Examples of the aforementioned rosin ester include tall oil rosin ester or gum rosin ester or a mixture thereof, and so forth, but tall oil rosin ester is preferable.

The aforementioned esterification reaction is performed by heating a rosin or rosin derivative and a polyhydric alcohol to 200–300° C., under an inert gas atmosphere, and by then removing the produced water from the system.

Examples of the aforementioned polyhydric alcohols are glycerin, trimethylolethane, trimethylolpropane, diethylene glycol, triethylene glycol, 1,6-hexanediol, pentaerythritol, dipentaerythritol, sorbitol, and so forth.

The amount of polyhydric alcohol used affects the acid value of the rosin ester, and it is closely related to the weight-average molecular weight, viscosity, and solubility of the obtained resin varnish, so it is somewhat limited, and normally it is 1.5 mol eq. or less, preferably 0.1–1.1 mol eq., relative to the total carboxylic acid of the rosin components and the added components. When it is greater than this amount, the resin solubility decreases. Conversely, when it is smaller, the acid value decrease slows.

The acid value of the rosin ester obtained by means of the esterification reaction normally is 5–100 and preferably is 8–40. When the acid value is less than 5, the viscosity increase after resole addition is high. When the acid value exceeds 100, there is risk of not reaching the viscosity required by a resin varnish for ink. Also, when the acid value of a varnish increases, the system stability generally deteriorates, so it tends to adversely affect the emulsifiability in the offset printing ink.

In the aforementioned rosin ester, of the various contained resin acids, the contents by percentage of the resin acids of non-conjugate acid family or conjugate acid family, other than aromatic resin acid, affect the reactivity with the resole initial condensate. Of these, the conjugate resin acid contributes significantly to the reactivity, so it is particularly important. On the other hand, an aromatic resin acid (e.g., dehydroabietic acid) does not undergo a condensation reaction with a resole resin. However, a fixed proportion is important to ensure the solubility of rosin ester in ink solvent.

Consequently, for resin acid composition of the rosin ester, the content by percentage of the conjugate resin acid must be 30–60 wt %, preferably 35–45 wt %. If it is less than 30 wt %, the reactivity with the resole condensate decreases, so the targeted high-molecular-weight, high-viscosity resin is not obtained. If it is higher than 60 wt %, the resin's viscosity increases significantly and interferes with the stirring operation.

Also, for the resin acid composition, the content by percentage of the aromatic resin acid must be 20–60 wt %, preferably 35–50 wt %. If it is less than 20 wt %, the solubility in ink solvent decreases, thereby interfering with the production of the targeted high-molecular-weight and high-viscosity resin. If it exceeds 60 wt %, the content by percentage of the aforementioned conjugate resin acid in the rosin ester decreases, thereby adversely affecting the reactivity.

The proton NMR measurement method is used to compute the amount of conjugate acid in the aforementioned resin acid. That is, measurement of the resin acid composition in the rosin ester generally is performed by gas chromatography, after hydrolysis and under alkali conditions. However, this method is complex and time-consuming. On the other hand, in proton NMR measurement, a convenient measurement method, it is known that the absorption band in the vicinity of $\delta=7$ ppm is attributable to aromatic resin acid, and that the absorption band at $\delta=5$–6 ppm is attributable to conjugate acid-family resin acid. However, this is insufficient for the determination of the resin acid composition. Consequently, after multiple esters were used for proton NMR and gas chromatography after hydrolysis, it was found that a certain type of calibration curve was obtained between the intensity of olefin absorption related to the conjugated double bond traceable to the conjugate resin acid in proton NMR and the conjugate resin acid content ascertained by gas chromatography, so a correlation was obtained. The same applies to the aromatic resin acid, so in the present invention, the resin acid composition in rosin ester is computed based on proton NMR measurements.

To be specific, in the proton NMR measurement results, the absorption ratio of each resin acid relative to the total proton absorption is computed, after which the amount of each resin acid is computed by multiplying these by the coefficient of correlation with gas chromatography.

The resole initial condensate used in the condensation process of the present invention is first subjected to a condensation reaction in ink solvent, and with it dissolved in the ink solvent, it is reacted with a rosin ester. In the condensation reaction between phenol and formaldehyde, normally 5–100, preferably 10–50, parts by wt. of ink solvent is added per 100 parts by wt. phenol and formaldehyde fed to the reaction.

The aforementioned phenol used can be any aromatic compound with a phenolic hydroxyl group, such as phenol, p-cresol, p-tert butylphenol, p-amylphenol, p-octylphenol, p-nonylphenol, p-dodecylphenol, bisphenol A, and so forth. Of these, however, alkylphenol compounds with a C4–C12 alkyl group substituted in the para- position are preferable.

A paraformaldehyde and formalin aqueous solution is used as the aforementioned aldehyde.

In the condensation reaction between the aforementioned phenol and formaldehyde, an alkali catalyst (e.g., potassium hydroxide, sodium hydroxide, calcium hydroxide, magnesium hydroxide, amines, ammonia aqueous solution) is used.

As the initial condensate obtained by means of the aforementioned reaction, a resole-type phenolic resin with 1–8 nuclei after resole processing or after novalac and then resole processing is preferable, for example.

The resinification process follows the aforementioned condensation process. In the resinification process, this resole initial condensate and the aforementioned rosin ester are reacted while being dehydrated in a system containing an ink solvent, thereby producing a rosin-modified phenolic resin (i.e., resin varnish). This reaction temperature is lower than the temperature in a conventional bulk polymerization method, and normally is 100–250 ° C., preferably 180–230 ° C., and it also is possible to react in a vacuum of 500 mmHg or less. The reaction is terminated while the rosin-modified phenolic resin's weight-average molecular weight is within the range 10,000–1,000,000, preferably 30,000–300,000.

The mixture proportion of both components when producing a resin varnish is 40–150, preferably 50–100, parts by wt. of resole initial condensate to 100 parts by wt. of rosin ester.

In the present invention, the rosin ester used is such that the contents by percentage of both the conjugate resin acid and the aromatic resin acid are within specific ranges, so it is possible to efficiently produce resin varnish of a high-molecular-weight rosin-modified phenolic resin with a weight-average molecular weight of 10,000–1,000,000.

The basic principle of the present invention is the performance of the aforementioned phenol addition reaction in a system containing an ink solvent.

In this case, the resole initial condensate is produced in advance in the ink solvent, so resin varnish is produced by adding a rosin ester as is to the ink solvent solution of the resole condensate, by adding ink solvent as required, and by then performing the phenol addition reaction.

As the aforementioned ink solvent, paraffinic, napthenic, and aromatic solvents with a boiling point of at least 200° C. can be used. As the offset printing ink solvent, any commercially available one can be used. However, from the viewpoints of environmental protection and industrial health, an aroma-free paraffinic, naftanic, and so forth, solvent is preferable.

The appropriate proportion of ink solvent is 2–150, preferably 3–100, parts by wt. per total of 100 parts by wt. of rosin ester and resole initial condensate.

Also, in the present invention, in addition to the aforementioned ink solvent, the reaction system can contain a drying oil. In the present invention, it should be interpreted that the term "drying oil" includes "semidrying oil" like soybean oil.

Usable as the aforementioned drying oil are soybean oil, linseed oil, polymerized linseed oil, dehydrated castor oil, tall oil, safflower oil, tung oil, perilla oil, and so forth. Regarding the drying oil content, it is advisable to select a content within the range of the mixture amount after forming the gel varnish, so 3–60 parts by wt. per 100 parts by wt. of solid contents in the gel varnish is appropriate, and 5–25 parts by wt. is preferable.

In the present invention, the reaction system also can contain petroleum resin.

The aforementioned petroleum resin has one or more unsaturated bonds in the molecule, and classifying them concretely according to partial structures containing a carbon carbon double bond, the following petroleum resins can be used: indenes, coumarones, cyclopentadienes, and dicyclopentadienes having an unsaturated cyclic structure; pentenes and pentadienes with having an unsaturated hydrocarbon chain; and vinyltoluenes and a methylstyrenes having a carbon carbon double bond and an unsaturated hydrocarbon chain in which a conjugated aromatic is substituted.

Moreover, depending on the circumstances, it is possible to react the resole initial condensate with only a petroleum resin, instead of a rosin ester.

In the present invention, the reaction system also can contain an isocyanate compound and an epoxy compound with cross-linking action.

The aforementioned epoxy compound has at least two epoxy groups in the molecule, and a multifunctional epoxy compound having a weight-average molecular weight of 300–10,000 and an epoxy equivalent of 100–5000 can be used.

Specific examples of the epoxy compound are bisphenol A-type epoxy resin, hydrogenated bisphenol A-type epoxy resin, bisphenol F-type epoxy resin, novalac-type epoxy resin, glycidylamine-type epoxy resin, glyoxazole-type epoxy resin, dimer acid modified-type epoxy resin, rubber modified-type epoxy resin, brominated epoxy resin, alcohol glycidyl ether-type epoxy resin, condensation-type epoxy resin in a polyvalent alcohol molecule, tertiary fatty acid glycidyl ester epoxy resin, and so forth. Of these, however, a bisphenol A-type epoxy resin, an alcohol glycidyl ether-type epoxy resin or a condensation-type epoxy resin in a polyvalent alcohol molecule is preferable.

Commonly known aromatic, aliphatic, and alicyclic polyisocyanates can be used as the aforementioned isocyanate compound. Concrete examples are tolylene diisocyanate, 4,4'-diphenylmethane diisocyanate, 1,3-phenylene diisocyanate, hexamethylene diisocyanate, xylylene diisocyanate, 1,5-naphthylene diisocyanate, isophorone diisocyanate, dimeryl diisocyanate, lysine diisocyanate, hydrogenated 4,4'-diphenylmethane diisocyanate, hydrogenated tolylene diisocyanate, dimer acid diisocyanate, triphenylmethane isocyanate, and so forth.

As mentioned previously, the resin varnish is produced either by reacting the aforementioned rosin ester and resole initial condensate or by additionally reacting it in the presence of a petroleum resin, an epoxy compound or an isocyanate compound.

The gel varnish for printing ink is produced as follows: a solvent and drying oil are added to the obtained resin varnish to achieve the required gel varnish composition; a gelling agent is added, after which this is cooked at 120–220 ° C. to perform the gelling reaction; and the viscosity is regulated. Moreover, for cooking, a uniform mixed solution is prepared separately by adding a solvent, drying oil, and a gelling agent, and resin varnish may be added as is thereto.

If the resin varnish contains a gelling agent, it is possible to produce a gel varnish for a printing ink, that has a higher viscoelasticity. Also, if a gelling agent is added to the resin varnish produced in the ink solvent, the steps from resin production to finishing the varnish for printing ink can be performed in a series of processes, in contrast to the method in which solid rosin-modified phenolic resin is redissolved, a gelling agent is added, and varnish is formed. Therefore, extremely economical production becomes possible. The proportion of gelling agent added preferably is on the order of 0.01–3.0 parts by wt. per 100 parts by wt. of solid contents in the varnish.

Usable gelling agents include aluminum compounds (e.g., aluminum alcoholate, aluminum soap), metal soaps (e.g., of manganese, cobalt, zirconium), and alkanolamine gelling agents.

In the gel varnish for printing ink obtained in the present invention, a pigment (e.g., yellow, red, indigo or black) is dispersed, and, as required, compounds such as a friction resistance enhancer, an ink dryer, and a drying inhibitor are added, and this is regulated to obtain the appropriate viscosity, thereby yielding an offset ink (e.g., sheet-fed ink, web-fed ink, newspaper ink). Moreover, the varnish for printing ink of the present invention contains very few decomposition components or nonuniformly gelled components of rosin-modified phenolic resin, so it is preferable not only for offset printing ink, but also for screen printing and letterpress printing ink.

Then, the characteristics or advantageous features, and so forth, of the method of producing the resin varnish for printing ink of the present invention will be further described hereinafter.

First, Prior Art 1 mentioned previously, seeks to produce a high-viscosity, high-molecular-weight resin by lowering the reaction system's melting viscosity and reaction temperature, and by preventing the generation of decomposition products in the formation of gel varnish by redissolving the resin in order to react the resole initiate condensate with the rosin ester in the ink solvent.

In the present invention, which further improves this Prior Art 1, because a rosin ester having specific contents by percentage of a conjugate resin acid and an aromatic resin acid is reacted with the resole initial condensate in the ink solvent, the reactivity is promoted and the solubility is maintained, thereby enabling the more stable and efficient design of a high-viscosity, high-molecular-weight ink resin with few decomposition products. Consequently, it is possible to produce a gel varnish with characteristics resulting in high-speed printability such as high flow, low misting, quick drying, superior emulsification resistance, and so forth. Also, to deal with high-speed printability, it is necessary to produce a higher-molecular system by adding an epoxy compound, isocyanate compound and a gelling agent. In the present invention, the reaction in the ink solvent yields a uniform overall system viscosity, so these additions are easily and stably achievable.

Also, because of the superior printability of the gel varnish of the present invention, the flow properties and gloss are excellent in sheet-fed ink, and it sets rapidly and press sheet stacking is improved. This yields an ink that, as web-fed ink and newspaper ink, has superior high-speed applicability, low misting, ink properties that resist change over time, and high operational efficiency. As a waterless ink, this ink has improved cohesion and little soil of background.

Second, during the production of resin for printing ink, in conventional bulk polymerization methods the decomposition reactions proceed rapidly simultaneously with the addition reactions, so it is difficult to obtain sufficient viscosity and molecular weight in tall oil rosin containing a relatively large quantity of aromatic resin acid. Therefore, resin production uses mainly gum rosin that has less aromatic resin acid than tall oil rosin and that has considerable addition reactivity with phenol. The reason is that, before the adoption of aroma free-type ink solvent, high resin solubility was not required, so it was possible to adequately design with a gum rosin having good reactivity. Incidentally, as the rosin type, gum rosin ester is used in previously mentioned Prior Art 1, and gum rosin is used in Prior Art 2.

By contrast, in the present invention, a rosin ester and resole initial condensate are reacted in an ink solvent, so even if a tall oil rosin ester that is not much used conventionally is used, a high-performance ink resin can be produced easily, as long as the content-by-percentage conditions for the conjugate resin acid and the aromatic resin acid are satisfied.

Moreover, in the conventional bulk polymerization method, it is necessary to raise the temperature considerably during phenol addition because the esterification reaction is performed after a phenol resin is added to the rosin. The present invention uses a method in which phenolic resin is added to a rosin ester, so temperatures can be lowered at the adding reaction of phenol, which enables the addition reaction to proceed efficiently. Also, by adding an ink solvent, it is possible to reduce the increase in melting viscosity even after lowering the reaction temperature, thereby enabling reactions in the temperature region preferred for phenol addition. For these reasons, it is possible to efficiently produce ink resin having sufficient viscosity and molecular weight, even by using tall oil rosin.

Third, the production of resole initial condensate and the subsequent phenol addition reaction both are performed in ink solvent, so after resin varnish production, it is possible to easily prepare gel varnish simply by adding the required ink solvent and drying oil and then admixing a gelling agent. As a result, the troublesome conventional task of redissolving the solid resin in a solvent is not required, so it is possible to perform the series of processes from the production of rosin-modified phenolic resin to the preparation of gel varnish, thereby enabling the stable and extremely economical production of a rosin-modified phenolic resin with a high molecular weight.

Fourth, in previously mentioned Prior Art 1, aromatic xylene was used in the resole condensation reaction. In the present invention, however, in the production of resole initial condensate, an ink solvent usable as is in subsequent processes is used, so the process of removing solvents (e.g., xylene) becomes unnecessary and processes from the production of rosin-modified phenolic resin to the preparation of gel varnish are performed consecutively, so it becomes unnecessary to solidify and redissolve resin. This improves productivity and is designed to improve environmental protection and industrial health and to reduce waste. Moreover, the use of an aroma-free solvent as the ink solvent contributes more effectively to environmental protection and industrial health.

DETAILED DESCRIPTION

The following table shows the printability test results for printing inks produced by using the gel varnishes of Embodiments 1–8 and Comparative Example 1.

|  | Embodiment 1 | Embodiment 2 | Embodiment 3 | Embodiment 4 | Embodiment 5 | Embodiment 6 | Embodiment 7 | Embodiment 8 | Example 1 Comparative |
| --- | --- | --- | --- | --- | --- | --- | --- | --- | --- |
| Varnish viscosity (E type, PaxS) | 150 | 90 | 250 | 120 | 120 | 350 | 330 | 340 | 285 |
| n-hexane tolerance (g/g) | 5.0 | 6.0 | 4.5 | 5.5 | 6.9 | 2.8 | 3.1 | 3.0 | 4.3 |

-continued

|  | Embodiment 1 | Embodiment 2 | Embodiment 3 | Embodiment 4 | Embodiment 5 | Embodiment 6 | Embodiment 7 | Embodiment 8 | Example 1 Comparative |
|---|---|---|---|---|---|---|---|---|---|
| Ink viscosity (L type, PaxS) | 15.3 | 15.0 | 16.5 | 14.8 | 14.5 | 18.3 | 18.0 | 17.6 | 16.3 |
| Yield value (dynes/cm$^2$) | 7932 | 7013 | 8205 | 7914 | 7471 | 9638 | 8673 | 9314 | 8092 |
| Tackiness (400 rpm, 30° C.) | 6.2 | 6.0 | 5.7 | 6.2 | 6.4 | 5.8 | 5.7 | 5.6 | 5.8 |
| Flow (60 sec, mm) | 42 | 46 | 40 | 44 | 40 | 38 | 38 | 36 | 40 |
| Gloss | 70.2 | 75.3 | 68.5 | 72.5 | 70.5 | 66.0 | 67.0 | 66.5 | 62.2 |
| Concentration | 2.5 | 2.7 | 2.4 | 2.6 | 2.4 | 2.3 | 2.3 | 2.2 | 2.0 |
| Dryness to touch | 5 | 5 | 5 | 5 | 4 | 5 | 5 | 4 | 3 |
| Max. emulsificafion (%) | 38 | 41 | 36 | 38 | 39 | 34 | 35 | 35 | 52 |
| Misting | 4 | 3 | 4 | 4 | 4 | 5 | 5 | 5 | 3 |

Next, an example of the preparation of the resole initial condensate, embodiments of the production of the resin varnish of the present invention, which was prepared by reacting the aforementioned resole condensate with a rosin ester, and an example of the printability test for the printing ink prepared by using the resin varnish will be discussed successively. The above table shows the results of the printability test. Also, in the following production examples, embodiments, and test example, "%" and "parts" are by weight.

Moreover, the present invention is not restricted to the following embodiments and test examples. Naturally, it can be modified as desired within the scope of the technical concepts of the present invention.

Example of the Preparation of Resole Initial Condensate

In a reaction vessel, 420 parts para-octyl phenol, 130 parts 92% paraformaldehyde, and 150 parts AF7 solvent (made by NIPPON OIL CORP) were added and admixed, after which 1 part sodium hydroxide was added, and this was heated to 95° C. and maintained at that temperature for 3 hours, after which 150 parts AF7 solvent were added and admixed, thereby yielding 851 parts of ink solvent solution of the resole resin (solid content: 63.5%).

Next explained will be embodiments of the production of the resin varnish (i.e., resin for printing ink), which is prepared by reacting this resole initial condensate and tall rosin ester in ink solvent.

Resin Varnish Production Embodiments

Of the Embodiments 1–9 mentioned hereinafter, Embodiments 1–4 are examples of the reaction of a tall oil rosin ester having a conjugate acid and an aromatic acid within specific ranges with a resol initial condensate; Embodiment 5 is an example of the coexistence of a petroleum resin; Embodiment 6 is an example of the coexistence of an epoxy resin; Embodiment 7 is an example of the coexistence of an isocyanate compound; Embodiment 8 is an example of the use of a gum rosin ester; and Embodiment 9 is an example of the addition of a gelling agent in the final step of gel varnish production.

On the other hand, regarding Comparative Examples 1–6, Comparative Example 1 is an example of the production of a resin for ink by redissolving solid rosin-modified phenolic resin in an ink solvent; Comparative Example 2 is an example of the use of a tall oil rosin instead of tall oil rosin ester; Comparative Example 3 is an example in which the content by percentage of the conjugate acid of the tall oil rosin ester is the upper limit of the specific range of the present invention, and the content by percentage of the aromatic acid is less than the lower limit of the same range; Comparative Example 4 is an example in which the content by percentage of the conjugate acid of the tall oil rosin ester is less than the lower limit of the same range, and the content by percentage of the aromatic acid is near the upper limit of the same range; Comparative Example 5 is an example in which the content by percentage of the conjugate acid of the tall oil rosin ester is the lower limit of the same range, and the content by percentage of the aromatic acid exceeds the upper limit of the same range; Comparative Example 6 is an example in which a gum rosin ester is used, the content by percentage of the conjugate acid of the rosin ester exceeds the upper limit of the same range, and the content by percentage of the aromatic acid is less than the lower limit of the same range.

(1) Embodiment 1

After 660 parts of tall rosin glycerin ester regulated to acid value 20 (non-aromatic conjugate resin acid content by percentage: 43%; aromatic resin acid content by percentage: 42%) were added to and melted in a reaction vessel, 100 parts of AF7 solvent and 851 parts of the resole resin solution of the aforementioned production example were added and this was reacted at 200° C. while removing condensed water, thereby yielding 1488 parts of resin varnish with a weight-average molecular weight of 150,000.

On the other hand, a mixed solution of 960 parts AF7 solvent, 320 parts soybean oil, and 16 parts of gelling agent (Chelope EP-12, made by HOPE CHEMICAL Co., Ltd.) was prepared in another reaction vessel, and the aforementioned resin varnish was added to this mixed solution, after which it was cooked for 1 hour at 170° C., thereby yielding 2784 parts of gel varnish with a viscosity of 150 PaxS and an n-hexane tolerance 5.0 g/g.

(2) Embodiment 2

After 660 parts of tall rosin glycerin ester regulated to acid value 20 (conjugate resin acid content by percentage: 38%, aromatic resin acid content by percentage: 47%) were added to and melted in a reaction vessel, 100 parts of AF7 solvent and 851 parts of the resole resin solution of the aforementioned production example were added and this was reacted at 200° C. while removing condensed water, thereby yielding 1488 parts of resin varnish with a weight-average molecular weight of 90,000.

On the other hand, a mixed solution of 960 parts of AF7 solvent, 320 parts of soybean oil, and 16 parts of gelling agent (Chelope EP-12, made by HOPE CHEMICAL Co., Ltd.) was prepared in another reaction vessel, and the aforementioned resin varnish was added to this mixed solution, after which it was cooked for 1 hour at 170° C., thereby yielding 2784 parts of gel varnish with a viscosity of 90 PaxS and an n-hexane tolerance of 6.0 g/g.

(3) Embodiment 3

After 660 parts of tall rosin glycerin ester regulated to acid value 20 (conjugate resin acid content by percentage: 45%, aromatic resin acid content by percentage: 40%) were added to and melted in a reaction vessel, 100 parts of AF7 solvent and 851 parts of the resole resin solution of the aforementioned production example were added and this was reacted at 200° C. while removing condensed water, thereby yielding 1488 parts of resin varnish with a weight-average molecular weight of 250,000.

On the other hand, a mixed solution of 960 parts of AF7 solvent, 320 parts of soybean oil, and 16 parts of gelling agent (Chelope EP-12, made by HOPE CHEMICAL Co., Ltd.) was prepared in another reaction vessel, and the aforementioned resin varnish was added to this mixed solution, after which it was cooked for 1 hour at 170° C., thereby yielding 2784 parts of gel varnish with a viscosity of 250 PaxS and an n-hexane tolerance of 4.5 g/g.

(4) Embodiment 4

After 660 parts of tall rosin glycerin ester regulated to acid value 20 (conjugate resin acid content by percentage: 43%, aromatic resin acid content by percentage: 45%) were added to and melted in a reaction vessel, 100 parts of AF7 solvent and 851 parts of the resole resin solution of the aforementioned production example were added and this was reacted at 200° C. while removing condensed water, thereby yielding 1488 parts of resin varnish with a weight-average molecular weight of 110,000.

On the other hand, a mixed solution of 960 parts of AF7 solvent, 320 parts of soybean oil, and 16 parts of gelling agent (Chelope EP-12, made by HOPE CHEMICAL Co., Ltd.) was prepared in another reaction vessel, and the aforementioned resin varnish was added to this mixed solution, after which it was cooked for 1 hour at 170° C., thereby yielding 2784 parts of gel varnish with a viscosity of 120 PaxS and an n-hexane tolerance of 5.5 g/g.

(5) Embodiment 5

After rosin ester was melted based on Embodiment 1, 42 parts of petroleum resin (Marukarez T 200A, made by MARUZEN PETROCHEMICAL Co., Ltd.) were added, after which it was handled with the other conditions the same as in the aforementioned Embodiment 1 to produce a resin varnish having a weight-average molecular weight of 80,000, thereby yielding, via a gel varnish process, a gel varnish with a viscosity of 120 PaxS and an n-hexane tolerance of 6.9 g/g.

(6) Embodiment 6

Based on Embodiment 1, after rosin ester was melted and resole resin solution and AF7 solvent were added, 13.2 parts of epoxy compound (YD-128, made by TOHTO KASEI Co., Ltd.) were added, after which it was handled with the other conditions the same as in the aforementioned Embodiment 1 to produce a resin varnish having a weight-average molecular weight of 200,000, thereby yielding, via a gel varnish process, a gel varnish with a viscosity of 350 PaxS and an n-hexane tolerance of 2.8 g/g.

(7) Embodiment 7

Based on Embodiment 1, after rosin ester was melted and resole resin solution and AF7 solvent were added, 13.2 parts of Takenate 80 (isocyanate, made by MITSUI TAKEDA CHEMICALS, Ltd.) were added, after which it was handled with the other conditions the same as in the aforementioned Embodiment 1 and reacted until the weight-average molecular weight became 200,000. By means of identical subsequent operations, a gel varnish with a viscosity of 330 PaxS and an n-hexane tolerance of 3.1 g/g was obtained.

(8) Embodiment 8

After 660 parts of gum rosin glycerin ester regulated to acid value 20 (conjugate resin acid content by percentage: 55%, aromatic resin acid content by percentage: 42%) were added to and melted in a reaction vessel, 100 parts of AF7 solvent and 851 parts of the resole resin solution of the aforementioned production example were added and this was reacted at 200° C. while removing condensed water, thereby yielding 1488 parts of resin varnish with a weight-average molecular weight of 250,000.

On the other hand, a mixed solution of 960 parts of AF7 solvent, 320 parts of soybean oil, and 16 parts of gelling agent (Chelope EP-12, made by HOPE CHEMICAL Co., Ltd.) was prepared in another reaction vessel, and the aforementioned resin varnish was added to this mixed solution, after which it was cooked for 1 hour at 170° C., thereby yielding 2784 parts of gel varnish with a viscosity of 340 PaxS and an n-hexane tolerance of 3.0 g/g.

(9) Embodiment 9

Except for the fact that the gelling agent EP-12 added in the final process of Embodiment 1 was omitted, the regulation proceeded with exactly the same composition and reaction operation, and a varnish with a viscosity of 90 PaxS and an n-hexane tolerance of 7.0 g/g was obtained. 13 parts of EP-12 were added to this varnish, and this was cooked for 1 hour at 170° C., after which a gel varnish with the same properties as in Embodiment 1 (i.e., a viscosity of 150 PaxS and an n-hexane tolerance of 5.0 g/g) was obtained.

(10) Comparative Example 1

A resole resin was synthesized in xylene, and this resole resin was added to and reacted with molten rosin, after which the conventional solid rosin-modified phenolic resin (Hariphenol P 637, made by HARIMA CHEMICALS, Inc., weight-average molecular weight: 100,000), which was obtained by esterifying by means of polyhydric alcohol, was used to form exactly the same varnish composition as in Embodiment 1, and this was cooked for 1 hour at 170° C., thereby yielding a gel varnish with a viscosity of 285 PaxS and an n-hexane tolerance of 4.3 g/g.

(11) Comparative Example 2

Based on Embodiment 1, tall oil rosin (acid value: 168, conjugate resin acid content by percentage: 65%) was used instead of rosin ester to operate with the other conditions as in Embodiment 1, and the growth stopped at a weight-average molecular weight of 2,000, so the reaction could not proceed to the gel varnish process.

(12) Comparative Example 3

After 660 parts of tall rosin glycerin ester regulated to acid value 25 (conjugate resin acid content by percentage: 60%, aromatic resin acid content by percentage: 15%) were added to and melted in a reaction vessel, 100 parts of AF7 solvent and 851 parts of the resole resin solution of the aforementioned production example were added and this was reacted at 200° C. while removing condensed water, but the molecular weight increased excessively during the reaction and the solution gelled, so the reaction could not be continued.

Incidentally, even with a rosin ester with 20–40% aromatic resin acid and the conjugate resin acid content by percentage at least 60%, this solution gelled during the reaction between the resole resin and rosin ester, so it was impossible to produce the gel varnish.

(13) Comparative Example 4

After 660 parts of tall rosin glycerin ester regulated to acid value 18 (conjugate resin acid content by percentage: 25%, aromatic resin acid content by percentage: 58%) were added to and melted in a reaction vessel, 100 parts of AF7 solvent and 851 parts of the resole resin solution of the aforementioned production example were added and this was reacted at 200° C. while removing condensed water, thereby yielding 1488 parts of resin varnish with a weight-average molecular weight of 60,000.

On the other hand, a mixed solution of 960 parts of AF7 solvent, 320 parts of soybean oil, and 16 parts of gelling agent (Chelope EP-12, made by HOPE CHEMICAL Co., Ltd.) was prepared in another reaction vessel, and the aforementioned resin varnish was added to this mixed solution, after which it was cooked for 1 hour at 170° C., thereby yielding 2784 parts of gel varnish with a viscosity of 35 PaxS and an n-hexane tolerance of 12.4 g/g.

(14) Comparative Example 5

After 660 parts of tall rosin glycerin ester regulated to acid value 20 (conjugate resin acid content by percentage: 30%, aromatic resin acid content by percentage: 65%) were added to and melted in a reaction vessel, 100 parts of AF7 solvent and 851 parts of the resole resin solution of the aforementioned production example were added and this was reacted at 200° C. while removing condensed water, thereby yielding 1488 parts of resin varnish with a weight-average molecular weight of 45,000.

On the other hand, a mixed solution of 960 parts of AF7 solvent, 320 parts of soybean oil, and 16 parts of gelling agent (Chelope EP-12, made by HOPE CHEMICAL Co., Ltd.) was prepared in another reaction vessel, and the aforementioned resin varnish was added to this mixed solution, after which it was cooked for 1 hour at 170° C., thereby yielding 2784 parts of gel varnish with a viscosity of 22 PaxS and an n-hexane tolerance of 15.3 g/g.

(15) Comparative Example 6

After 660 parts of gum rosin glycerin ester regulated to acid value 32 (conjugate resin acid content by percentage: 65%, aromatic resin acid content by percentage: 15%) were added to and melted in a reaction vessel, 100 parts of AF7 solvent and 851 parts of the resole resin solution of the aforementioned production example were added and this was reacted at 200° C. while removing condensed water. However, as in the aforementioned Comparative Example 3, the molecular weight increased excessively during the reaction and the solution gelled, so the reaction could not be continued.

So, the gel varnishes obtained in Embodiments 1–9, Comparative Example 1, and Comparative Examples 4 and 5 were used to prepare printing ink, and the printability quality was evaluated.

Printability Test Example

For the gel varnishes obtained in the embodiments and the comparative examples, 18 parts of red pigment (Brilliant Carmine 6B, made by TOYO INK MFG. Co., Ltd.) were dispersed by means of a three-roll mill, and AF7 solvent and gel varnish were added to a total of 100 parts, after which this was prepared until the tackiness reached 5–6 and the flow reached 36–40, thereby yielding offset printing ink. Next, each printing ink was used for the various printability tests listed hereinafter.

However, because the viscosities of the gel varnishes of Comparative Examples 4 and 5 were extremely low, it was impossible to produce printing inks with the required application levels, so they could not be used in printability tests.

Also, the properties in Embodiment 9 were identical to those in Embodiment 1, so the tests were omitted.

(1) Ink viscosity and yield value : Measured by means of an L-type viscosity meter (made by TOYOSEIKI SEISAKU-SYO, Ltd.).

(2) Tackiness: Conforms to Japan Industrial Standard K5701 and is measured by means of a misting tester (made by TOYOSEIKI SEISAKU-SYO, Ltd.).

(3) Flow: A Spread-O-Meter (made by RIGOSHA & Co., Ltd.) was used to measure the ink spreading (diameter in mm, 60-sec. value), in conformity with Japan Industrial Standard K5701.

(4) Gloss value: A gloss meter (made by MJRAKI COLOR RESEARCH LABORATORY) was used to measure this value, in conformity with Japan Industrial Standard K5701.

(5) Density: A reflection densitometer was used to measure the same test paper as in the gloss measurements, in conformity with Japan Industrial Standard K5701.

(6) Dryness to touch : Immediately after 0.1 cc of ink was spread on art paper by means of an RI tester (made by ISHIKAWAJIMA INDUSTRIAL MACHINERY Co., Ltd.) 2-cut roll, the paper was placed under a dryer's hot air, and the dryness of the printed surface was determined by means of touch, after which the drying times were compared. For the evaluation, a five-stage evaluation was performed, with Comparative Example 1 regarded as 3 and the sample with the best drying properties regarded as 5. That is, an evaluation between Comparative Example 1 and the best sample was regarded as 4, one inferior to Comparative Example 1 was regarded as 2, and one even more inferior was regarded as 1.

(7) Maximum emulsification: A LITHOTRONIC emulsification tester (made by NOVOCONTROL GmbH) was used to measure the moisture content after the ink was saturated by adding water at the rate of 2 ml/min. to 25 g of ink at 40° C., and the amount of moisture increase was represented as a percentage by dividing this amount of moisture increase by the weight of the original ink. Moreover, the rotational speed of the emulsification tester was 1200 rpm.

(8) Misting: Two cups of ink were placed in an Ink-O-Meter (made by TOYOSEIKI SEISAKU-SYO, Ltd.), and after it was rotated for 2 min. at 2000 rpm at a roll temperature of 40° C., the ink dispersal on white paper placed below and in front of the roll was observed. For the evaluation, a five-stage evaluation was performed, with Comparative Example 1 regarded as 3 and the best sample regarded as 5. The evaluation details were identical to those in the aforementioned test (6) (i.e., dryness to touch).

The test results are listed in the hereinabove table.

In contrast to Comparative Example 1 in which solid resin was redissolved, Embodiments 1–8 formed a gel varnish from the rosin-modified phenolic resin obtained by reacting in an ink solvent. Embodiments 1–8 had a good flow, so the transferability improved, and the gloss was better than Comparative Example 1.

Also, it was determined that the dryness to touch and the misting of Embodiments 1–8 were better than those in Comparative Example 1.

Furthermore, the maximum emulsification of Embodiments 1–8 was significantly lower than that of Comparative Example 1, so it was determined that the former has superior emulsification resistance.

In summary, it became evident that, in contrast to Comparative Example 1 in which a solid resin produced by means of a conventional bulk polymerization method was formed into a gel varnish, Embodiments 1–8, in which the resin obtained by reacting a resole initial condensate and a tall rosin ester in an ink solvent was formed into gel varnish by means of a series of processes, demonstrated significant superiority with respect to high flow, quick drying, low misting, and emulsification resistance, resulting in superior high-speed printability.

Also, in Comparative Examples 3–6, in which rosin esters with contents by percentage of conjugate acid and aromatic resin acid outside the specified ranges were used, serious problems occurred (e.g., it became difficult to prepare gel varnish because the reaction system gelled, or it was impossible to produce ink that withstood use because the obtained gel varnish had insufficient viscosity). Therefore, it was determined that the contents by percentage of the aromatic resin acid and the conjugate acid contained in the rosin ester are extremely important in the production of printing ink having high-speed printability.

What we claim is:

1. A method of producing resin varnish for printing ink, said resin varnish having a weight average molecular weight of 10,000 to 1,000,000, said method comprising the steps of:
   (a) condensing phenol and formaldehyde in an ink solvent to produce a solution of a phenol-formaldehyde initial condensate in said ink solvent;
   (b) reacting reactants comprising said solution of said phenol-formaldehyde initial condensate in said ink solvent and a rosin ester containing 30–60 wt % of a non-aromatic conjugate resin acid and 20–60 wt % of an aromatic resin acid, in a resinification reaction, at a temperature of 100–250° C., to produce a resin varnish; and
   (c) terminating said resinification reaction when said resin varnish has a weight average molecular weight of 10,000 to 1,000,000.

2. The method of claim 1, wherein said rosin ester is a tall oil rosin ester.

3. The method of claim 1 or 2, wherein said rosin ester has an acid value of 5–100.

4. The method of claim 1 or 2, wherein said reactants in step (b) further comprise a petroleum resin.

5. The method of claim 1 or 2, wherein said reactants in step (b) further comprise one of an epoxy compound and an isocyanate compound.

6. The method of claim 1 or 2, wherein said reactants in step (b) further comprise a gelling agent.

7. The method according to claim 1, wherein the step of reacting in step (b) is performed in the presence of a drying oil added to said reactants.

8. The method according to claim 1, wherein the step of reacting in step (b) is carried out under a vacuum of up to 500 mm Hg.

* * * * *

UNITED STATES PATENT AND TRADEMARK OFFICE
CERTIFICATE OF CORRECTION

PATENT NO. : 6,894,096 B2
APPLICATION NO. : 10/438614
DATED : May 17, 2005
INVENTOR(S) : Keiji Sasakura et al.

It is certified that error appears in the above-identified patent and that said Letters Patent is hereby corrected as shown below:

<u>Column 15, line 21 through Column 16, line 26,</u>
Claims 1-14 should read as follows:

1. A method of producing resin varnish for printing ink, said resin varnish having a weight average molecular weight of 10,000 to 1,000,000, said method comprising the steps of:
    (a) condensing phenol and formaldehyde in an ink solvent to produce a solution of a phenol-formaldehyde initial condensate in said ink solvent;
    (b) reacting reactants comprising said solution of said phenol-formaldehyde initial condensate in said ink solvent and a rosin ester containing 30-60 wt% of a non-aromatic conjugate resin acid and 20-60 wt% of an aromatic resin acid, in a resinification reaction, at a temperature of 100 - 250 °C, to produce a resin varnish: and
    (c) terminating said resinification reaction when said resin varnish has a weight average molecular weight of 10,000 to 1,000,000.

2. The method of claim 1, wherein said rosin ester is a tall oil rosin ester.

3. The method of claim 1 or 2, wherein said rosin ester has an acid value of 5 - 100.

4. The method of claim 1 or 2, wherein said reactants in step (b) further comprise a petroleum resin.

5. The method of claim 1 or 2, wherein said reactants in step (b) further comprise one of an epoxy compound and an isocyanate compound.

6. The method of claim 1 or 2, wherein said reactants in step (b) further comprise a gelling agent.

7. The method according to claim 1, wherein the step of reacting in step (b) is performed in the presence of a drying oil added to said reactants.

8. The method according to claim 1, wherein the step of reacting in step (b) is carried out under a vacuum of up to 500 mm Hg.

9. The method according to claim 1, wherein a further ink solvent is added in step (b).

10. The method according to claim 9, wherein said further ink solvent added in step (b) is the same as said ink solvent in step (a).

UNITED STATES PATENT AND TRADEMARK OFFICE
CERTIFICATE OF CORRECTION

PATENT NO. : 6,894,096 B2
APPLICATION NO. : 10/438614
DATED : May 17, 2005
INVENTOR(S) : Keiji Sasakura et al.

It is certified that error appears in the above-identified patent and that said Letters Patent is hereby corrected as shown below:

<u>Column 15, line 21 through Column 16, line 26 (cont'd),</u>

11. The method according to claim 9, wherein said further ink solvent added in step (b) is different from said ink solvent in step (a).

12. A method of producing resin varnish for printing ink, said resin varnish having a weight average molecular weight of 10,000 to 1,000,000, said method comprising the steps of:
    (a) condensing phenol and formaldehyde in a first ink solvent to produce a solution of a phenol-formaldehyde initial condensate in said first ink solvent;
    (b) reacting reactants comprising said solution of said phenol-formaldehyde initial condensate in said first ink solvent and a rosin ester containing 30-60 wt% of a non-aromatic conjugate resin acid and 20-60 wt% of an aromatic resin acid, in a second ink solvent, by a resinification reaction, at a temperature of 100 - 250 °C, to produce a resin varnish; and
    (c) terminating said resinification reaction when said resin varnish has a weight average molecular weight of 10,000 to 1,000,000.

13. The method according to claim 12, wherein said first ink solvent and said second ink solvent are the same.

14. The method according to claim 12, wherein said first ink solvent and said second ink solvent are different.

Signed and Sealed this

Nineteenth Day of September, 2006

JON W. DUDAS
*Director of the United States Patent and Trademark Office*